UNITED STATES PATENT OFFICE.

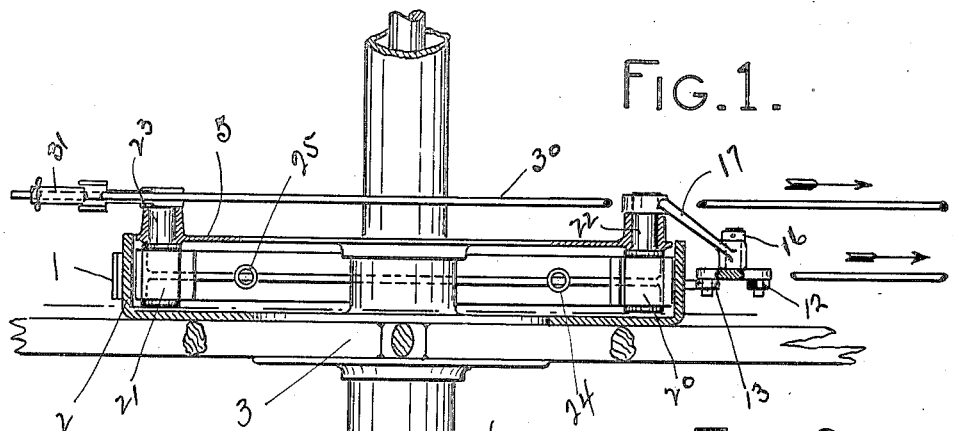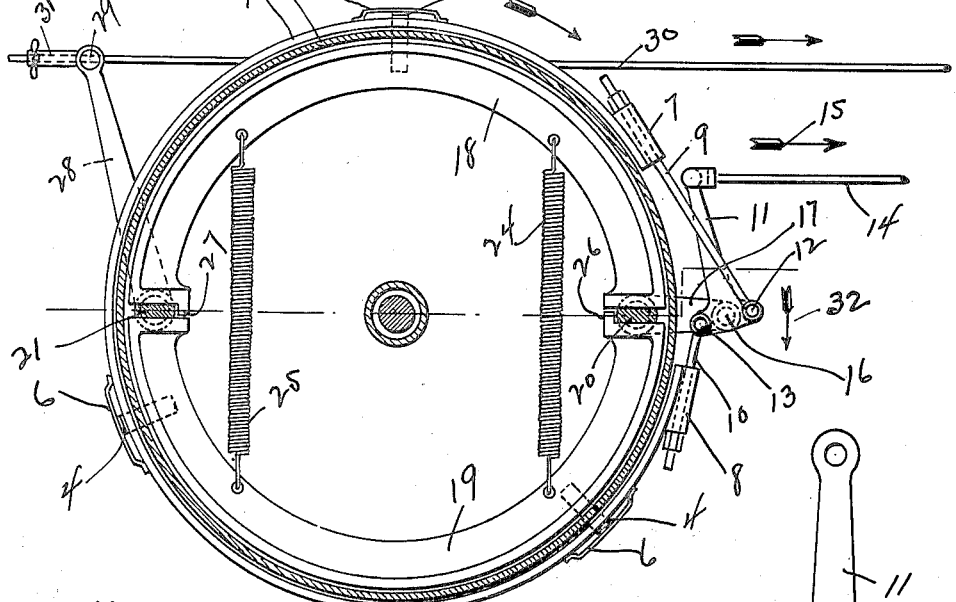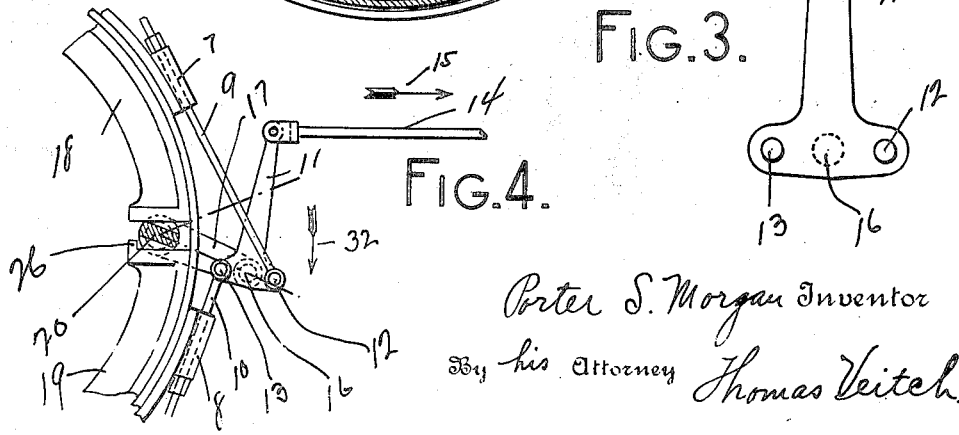

PORTER S. MORGAN, OF NORWALK, CONNECTICUT, ASSIGNOR TO ROTARY BRAKE COMPANY, INC., OF NEW YORK, N. Y., A CORPORATION.

POWER-BRAKE.

1,397,012.  Specification of Letters Patent.  Patented Nov. 15, 1921.

Application filed December 3, 1918. Serial No. 265,117.

*To all whom it may concern:*

Be it known that I, PORTER S. MORGAN, a citizen of the United States, and a resident of Norwalk, in the county of Fairfield and State of Connecticut, have invented certain new and useful Power-Brakes, of which the following is a specification.

My invention relates to brakes and particularly to that class of brakes that utilize the energy of motion of the moving body to furnish the power necessary to actuate them.

The objects of my invention are to provide a brake that may be operated and controlled with little physical effort; to provide a brake in which the pressure on the hand control lever is a measure of the brake retardation for reasons of control; to provide a power brake that may be operated independently, simultaneously or progressively from two distinct sources, directly by a hand or indirectly by a primary brake; to provide a power brake that may be adjusted for wear by a partial movement of the direct hand operating means, and still further to provide a power brake for motor vehicles that is capable of replacing the present brakes without any change in the rear axle structure.

The above enumerated objects and others that will later on appear are now to be described and are illustrated in the accompanying drawing forming a part of this specification.

Similar characters of reference denote like or corresponding parts throughout the several views of which Figure 2 is a sectional elevation of my invention applied to the rear axle brake drum of a motor vehicle; Fig. 1 is a horizontal cross section through one brake drum; Fig. 3 is an enlarged view of the primary brake actuating lever, and Fig. 4 is a part elevation similar to that of Fig. 2 but showing the brake in an engaged position.

My brake is of the primary and secondary class and comprises a primary band brake member 1, adapted to engage the outer surface of the drum 2, which is secured to the hub and wheel 3. The band 1 is, when disengaged, held out of contact with the drum 2 by the clips 4, secured to the stationary spider 5, and the springs 6 secured to the band 1. These springs are so shaped that after the band has been brought into contact with the drum it may have a limited angular movement therewith. The ends 7 and 8 of the brake member 1 are connected by the eye bolts 9 and 10 to the ends 12 and 13 of the head of the T shaped actuating lever 11. This lever is connected by the rod 14 preferably to the brake pedal of the vehicle and is adapted to be moved in the direction of the arrow 15 to cause the brake to engage. The lever 11 is fulcrumed at 16 upon the end of the secondary brake operating lever 17, the function of which will be hereafter described.

Located inside of the drum 2 is a secondary brake composed of members 18 and 19, adapted to engage the inside surface of the said drum through the angular rotation of either cam 20 or cam 21. The shaft portions of these cams have a bearing in the spider 5 at 22 and 23, respectively, and when the cams are in the positions shown in Fig. 2 they serve to center the shoe members and prevent their contact with the drum as the springs 24 and 25 hold the shoe ends firmly against the cams. The shoes are centered horizontally by the lugs 26 and 27 bearing against the inside edges of the cams.

Cam 21 is adapted to be turned for spreading and thus actuating the secondary brake by the lever 28, securely affixed to its shaft. The free end 29 of this lever is connected by the rod 30 to the emergency hand lever of the vehicle. An adjusting device for this rod is shown at 31.

The actuating lever 17 previously referred to is secured to the shaft of the cam 20 and with its axis parallel with the flat cam faces, so that it may have an equal angular range of action each side of its neutral or free position as shown in Fig. 2. In the drawing I have shown but one side of a motor vehicle rear axle and but one set of brakes. As two sets are required, they may be equalized between the corresponding rods 14 on each side or the cams 20 and 21 may be formed on the ends of the shafts extending to the other brakes with similar cams on the other ends, or the rod 30 and its corresponding rod on the other side may be equalized in any well known manner without in any way affecting the operation of my brakes.

The operation of my brakes is as follows: Assuming that both the primary and secondary brakes are free, as in Fig. 2, and that the drum 2 is rotating in the direction of the arrow 32, then if the hand or foot control lever (not shown) is moved and with it the rod 14, the lever 11 will be moved about the fulcrum 16 and the band 1 will be brought into contact with the turning drum, immediately there is a slight rotation of the entire band 1 together with the lever 11 in the direction of the arrow 32 and these assume approximately the positions shown in Fig. 4 where it will be noted that the rotation of the brake 1 above referred to has caused the secondary brake actuating lever 17, to turn downward and to spread the brake shoes 18 and 19 into engagement with the inside of the drum 2 tending to stop its rotation. As a part of the reaction of the primary brake is carried back to the hand or foot control lever through rod 14, the operator is always cognizant of the degree of brake action. If the rod 14 was moved slightly in a direction opposite to that indicated by the arrow 15, the lever 17, under the influence of the springs 24 and 25, would move upward an amount proportional to the releasing movement of the rod 14 and thus slightly "graduate off" the secondary brake.

If we assume that the brakes are again in the free position of Fig. 2 and it is desired to apply the emergency brake, connected through the rod 30 to the lever 28, a movement of this rod will rotate the cam 21 and thus spread the shoes 18 and 19 and apply the brake. If, however, when this had been done and insufficient braking effect resulted, it would be only necessary to move the rod 14 in the operating direction and a power turning of the cam 20 would take place and the additional braking action secured. The adjustment 31 may be used to take up wear for both braking systems or if such taking up was needed during a long run or on a long steep grade it would only be necessary to set the emergency brake lever up a notch or two and this would compensate for the wear. It will be clear from the above description of operation that the power brakes and the hand or emergency brakes may be applied independently, simultaneously or progressively and it is also clear that these two systems are fully as simple as the standard independent manually operated brakes now universally used on motor vehicles. A further great advantage of my braking system is that it may be applied to the vast numbers of existing motor vehicles as the shoes, connections, etc., are almost the same as for the present brakes. A still further advantage of my power brake is the fact that metal to metal may be used in the secondary brake, insuring long life and comparative freedom from burning.

Having thus described and illustrated my invention so that any one skilled in the art may make and construct the same and not limiting myself to the particular arrangement of parts shown, as for example the relative positions of the primary and secondary brakes or the shape of the cams and levers for operating the same, I claim:

1. A vehicle brake comprising a rotary drum and primary and secondary brake members adapted to engage the same, a momentum operated lever for actuating the secondary brake member, and means mounted upon the said lever for actuating the primary brake member, and, furthermore, to effect the momentum operation of the aforesaid lever.

2. A vehicle brake comprising a rotary drum and primary and secondary brake members adapted to engage the same, a momentum operated lever for actuating the secondary brake member, and means mounted upon the said lever for actuating the primary brake member, and, furthermore, to effect and control the momentum operation of the aforesaid lever.

3. A vehicle brake comprising a rotary drum and primary and secondary brake members adapted to engage the same, a momentum operated lever for actuating the secondary brake member, and means mounted upon the said lever for actuating the primary brake member, and, furthermore, to effect, to graduate and control the momentum operation of the aforesaid lever.

4. A vehicle brake comprising a rotary drum and primary and secondary brake members adapted to engage the same, a momentum operated lever for actuating the secondary brake member, and means mounted upon the said lever for actuating the primary brake member, and, furthermore, to effect and control the momentum operation of the aforesaid lever independently of the direction of rotation of the rotary member.

5. The combination with a rotary member of an inner secondary brake, an outer primary brake operated manually, means connecting the primary and secondary brakes to enable the primary brake through its momentum action to actuate the secondary brake and independent means for actuating the secondary brake.

6. The combination with a rotary member of an inner secondary brake, an outer primary brake operated manually, means connecting the primary and secondary brakes to enable the primary brake through its momentum action to actuate the secondary brake and independent manually operated means for actuating the secondary brake.

7. The combination with a rotary member of an inner secondary brake, an outer primary brake operated manually, means connecting the primary and secondary brakes to enable the primary brake through its momentum action to actuate the secondary brake and independent means for actuating and adjusting the secondary brake.

8. The combination with a rotary member of an inner secondary brake, an outer primary brake operated manually, means connecting the primary and secondary brakes to enable the primary brake through its momentum action to actuate the secondary brake and independent means for actuating and taking up the wear of the secondary brake.

9. The combination with a rotary member of an inner secondary brake, an outer primary brake, means connecting the primary and secondary brakes to enable the primary brake through its momentum action to actuate the secondary brake irrespective of the direction of motion of the rotary member and independent means connected to the secondary brake for actuating same.

10. The combination with a rotary member, of a secondary brake, a primary brake operated manually, means connecting the primary and secondary brakes to enable the primary brake through its momentum action to actuate the secondary brake, and independent manually operated means for actuating said secondary brake.

Signed at New York in the county of New York and State of New York this 27th day of November, A. D. 1918.

PORTER S. MORGAN.

Witnesses:
   THOMAS VEITCH,
   MYER LIBIEN.